US012134080B2

(12) United States Patent
Jang et al.

(10) Patent No.: US 12,134,080 B2
(45) Date of Patent: Nov. 5, 2024

(54) DISPENSER

(71) Applicant: LG FAROUK CO., Seoul (KR)

(72) Inventors: Kyung Sik Jang, Seoul (KR); Jung Yong Lee, Seoul (KR); Hyung Kyu Kim, Seoul (KR); Kyung Won Kim, Seoul (KR)

(73) Assignee: LG FAROUK CO., Seoul (KR)

( * ) Notice: Subject to any disclaimer, the term of this patent is extended or adjusted under 35 U.S.C. 154(b) by 0 days.

(21) Appl. No.: 17/796,551

(22) PCT Filed: Jan. 22, 2021

(86) PCT No.: PCT/KR2021/000869
§ 371 (c)(1),
(2) Date: Jul. 29, 2022

(87) PCT Pub. No.: WO2021/182747
PCT Pub. Date: Sep. 16, 2021

(65) Prior Publication Data

US 2023/0052182 A1 Feb. 16, 2023

(30) Foreign Application Priority Data

Mar. 12, 2020 (KR) ........................ 10-2020-0030802

(51) Int. Cl.
*B67D 7/78* (2010.01)
*A45D 44/00* (2006.01)
(Continued)

(52) U.S. Cl.
CPC .......... *B01F 33/841* (2022.01); *A45D 44/005* (2013.01); *A45D 2044/007* (2013.01); *B01F 2101/21* (2022.01)

(58) Field of Classification Search
CPC .. A45D 34/00; A45D 19/06; A45D 2044/007; B01F 33/841; B01F 33/341;
(Continued)

(56) References Cited

U.S. PATENT DOCUMENTS 1,349,960 A 8/1920 Hoepner
3,015,415 A * 1/1962 Marsh .................. G05D 11/001 222/14
(Continued)

FOREIGN PATENT DOCUMENTS

EP 0 461 371 A1 12/1991
IT 2018 0000 6133 A1 12/2019
(Continued)

*Primary Examiner* — Charles P. Cheyney
(74) *Attorney, Agent, or Firm* — Birch, Stewart, Kolasch & Birch, LLP

(57) ABSTRACT

The present disclosure relates to a dispenser, comprising: a housing; a plurality of cartridges which are disposed inside the housing; a mounting body to which the plurality of cartridges are mounted so as to be replaceable; a main motor which rotates the mounting body; and an elevating body which elevates such that a composition is discharged from any one of the plurality of cartridges, wherein the elevating body may be disposed so as to be displaced on a rotation path on which the plurality of cartridges rotate.

20 Claims, 11 Drawing Sheets

(51) Int. Cl.
*B01F 33/841* (2022.01)
*B01F 101/21* (2022.01)

(58) Field of Classification Search
CPC .............. B01F 35/7174; B01F 35/8822; B01F 2101/30
USPC ...................................... 222/135, 144, 144.5
See application file for complete search history.

(56) References Cited

U.S. PATENT DOCUMENTS 3,029,847 A * 4/1962 Heiss ....................... B01J 4/008 141/90
3,587,671 A * 6/1971 Gamberini .............. B65B 43/58 141/147
4,967,938 A 11/1990 Hellenberg
5,078,302 A * 1/1992 Hellenberg ......... B01F 35/7174 222/144.5
5,119,973 A * 6/1992 Miller ..................... B01F 33/84 222/144.5
5,356,041 A * 10/1994 Hellenberg ............. B01F 35/71 141/147
5,474,211 A * 12/1995 Hellenberg ......... B01F 35/7174 222/144.5
5,492,250 A 2/1996 Sardynski
5,558,251 A * 9/1996 Neri .......................... F04B 9/02 222/509
5,711,458 A * 1/1998 Langeveld .......... B01F 35/1452 222/144.5
5,938,080 A * 8/1999 Haaser ................ B01F 35/8822 222/144.5
5,992,691 A 11/1999 Post et al.
6,457,496 B1 * 10/2002 Chuang ................... B65B 43/60 141/144
8,448,823 B2 * 5/2013 Engels .................... B01F 33/84 222/23
8,960,994 B2 * 2/2015 Schwartz ............. A45D 44/005 366/140
9,656,226 B2 * 5/2017 Solera ..................... B05B 15/52
2004/0159676 A1 8/2004 Adema
2005/0087545 A1 * 4/2005 Petrus Engels ....... B01F 33/841 222/77
2012/0018034 A1 * 1/2012 Bertoli .................. B01F 33/841 141/69
2019/0080480 A1 3/2019 Nichol et al.
2019/0308149 A1 10/2019 Macedo et al.

FOREIGN PATENT DOCUMENTS

JP 2016-175414 A 10/2016
JP 2019-533615 A 11/2019
KR 10-2012-0138464 A 12/2012
KR 10-2018-0007500 A 1/2018
KR 10-2018-0109080 A 10/2018
KR 10-2019-0017059 A 2/2019
WO WO 2020/217529 A1 10/2020

* cited by examiner

DISPENSER

CROSS REFERENCE TO RELATED APPLICATIONS

This application is the National Phase of PCT/KR2021/000869 filed on Jan. 22, 2021, which claims priority under 35 U.S.C. § 119(a) to Patent Application No. 10-2020-0030802 filed in the Republic of Korea on Mar. 12, 2020, all of which are hereby expressly incorporated by reference into the present application.

TECHNICAL FIELD

The present disclosure relates to a dispenser that provides cosmetics such as foundation, hair dye, and the like.

BACKGROUND ART

Recently, with the development of the beauty industry, the types of cosmetics have become very diverse. However, since each user has different skin characteristics, hair characteristics, and the like, there is a limit to supplying cosmetics suitable for each user. Accordingly, a dispenser that provides cosmetics suitable for each user to the user has been developed.

Cosmetics may include not only products used for a skin of the user such as foundation and sun cream, but also products used for a hair of the user such as a hair dye.

The dispenser may manufacture may provide such cosmetics according to preference, taste, and the like for each user to provide the cosmetics to the user. For example, the dispenser may discharge various compositions so as to provide cosmetics that cover the skin or dye the hair with a color desired by the user.

Meanwhile, when such a composition is discharged, it may cause a problem that the inside of the dispenser is contaminated by discharging the composition to a place other than the intended basket. In addition, there is a problem that user inconvenience is caused when cleaning the composition discharged to the place other than the basket.

In addition, there is a problem that a volume of the dispenser is increased due to a structure for fixing the dispenser in which each of the compositions is accommodated.

DISCLOSURE

Technical Problem

The present disclosure is directed to providing a dispenser that minimizes a problem of contamination when a composition discharged from a cartridge is discharged to a place other than a basket.

The present disclosure is directed to providing a dispenser that minimizes a problem of interference between a cartridge and an elevating body for discharging the composition in the cartridge.

The present disclosure is directed to providing a dispenser that secures the ease of cleaning when the composition discharged from the cartridge is discharged to the place other than the basket.

The present disclosure is directed to providing a dispenser that minimizes an increase in volume due to a fixing structure of the cartridge.

Technical Solution

A dispenser according to an embodiment of the present disclosure may include a housing, a plurality of cartridges disposed inside the housing, a mounting body to which the plurality of cartridges are mounted so as to be replaceable, a main motor that rotates the mounting body, and an elevating body that moves up and down so that a composition is discharged from any one of the plurality of cartridges, wherein the elevating body may be disposed so as to be deviated from a rotation path on which the plurality of cartridges rotate.

A container in which the composition is accommodated and an actuator for discharging the composition accommodated in the container may be formed in each of the plurality of cartridges, and a discharge body having an outlet through which the composition accommodated in the container moves to the outside and an operating body for opening the outlet according to pressure may be formed in the actuator The dispenser may further include an elevating motor installed on a main body supporting the mounting body, wherein the elevating body may be connected to a side surface of the elevating motor.

The elevating body may be disposed closer to a front surface of the housing than the mounting body.

A plurality of mounting holes in which lower portions of each of the plurality of cartridges are accommodated may be formed in the mounting body.

A rubber ring may be disposed in each of the plurality of mounting holes.

A plurality of fixing members for fixing each of the plurality of cartridges are formed on the mounting body, and an upper portion of each of the plurality of cartridges may be fixed by the plurality of fixing members.

The dispenser may further include an accommodating body in which a basket in which the composition discharged from the plurality of cartridges is accommodated, wherein the accommodating body may be detachable from the housing.

A plate on which the basket is seated may be formed on the accommodating body, and a connection member that is in contact with a weight sensor when the accommodating body is disposed in the housing may be formed on the plate.

A connection hole through which the connection member passes may be formed in a base of the accommodating body.

A protrusion protruding upward from the base may be formed around the connection hole.

The dispenser may further include a plurality of pedestals receiving the composition discharged from the cartridges under the plurality of cartridges.

A cutter protruding upward may be formed on at least one of the plurality of pedestals.

An upper end of the cutter may be formed at the same height or lower than an outlet of the cartridge.

The cutter may be in plural, and the plurality of cutters may have different heights.

The cutter may be inclined toward a direction of rotation of the cartridge or a direction opposite to the direction of rotation of the cartridge.

When there are a plurality of cutters, an angle at which each of the plurality of cutters is inclined may be the same or different.

Advantageous Effects

According to an embodiment of the present disclosure, since an elevating body is disposed so as to be deviated from a rotation path on which a plurality of cartridges rotate, a problem that a composition discharged from the cartridge sticks to the elevating body or the like is minimized, thereby minimizing a problem of contamination of a dispenser.

In addition, since the elevating body is disposed so as to be deviated from the rotation path on which the plurality of cartridges rotate, it is possible to minimize a problem of being caught in the elevating body when the cartridge is rotated.

In addition, when the composition of the cartridge is discharged around a basket, since the accommodating body accommodated in the basket may be separated and washed, there is an advantage that a user may easily wash the dispenser.

In addition, when the composition suspended at an outlet of the cartridge is not discharged to the basket, a pedestal receives the composition, and thus there is an advantage that the ease of cleaning and management of the dispenser is improved.

In addition, since a fixing member for fixing the cartridge is mounted in a form surrounding an upper portion of the cartridge, there is an advantage that it is possible to minimize a volume of the dispenser.

MODES OF THE PRESENT DISCLOSURE

Figure 1:
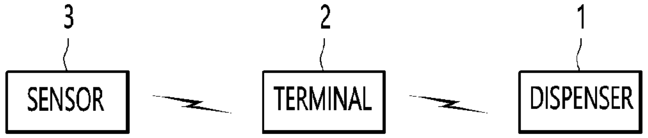
FIG. 1 is a block diagram of a cosmetic providing system according to an embodiment of the present disclosure.

Hereinafter, embodiments will be described in detail with reference to the accompanying drawings, however, the same components are designated by the same reference numerals, and repeated description thereof will be omitted.

Suffixes “module” and “part” for elements used in the following descriptions are given or used just for convenience in writing the specification, and do not have meanings or roles distinguishable between them.

In addition, in describing embodiments of the present disclosure, when detailed description of a known function is deemed to unnecessarily blur the gist of the present disclosure, the detailed description will be omitted. Further, accompanying drawings are only for easily understanding embodiments disclosed in the present disclosure, and the technical spirit disclosed in the present disclosure are not limited by the accompanying drawings, and it should be understood that the present disclosure includes all modifications, equivalents, and alternatives falling within the spirit and scope of the claims.

It should be understood that, although the terms first, second, and the like may be used herein to describe various elements, these elements are not limited by these terms. The terms are only used to distinguish one element from another.

Elements referred to in singular may be number one or more, unless the context clearly indicates otherwise.

It should be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof.

FIG. 1 is a block diagram of a cosmetic providing system according to an embodiment of the present disclosure.

The cosmetic providing system according to the embodiment of the present disclosure may include at least some or all of a dispenser 1, a terminal 2, and a sensor 3.

Each of the dispenser 1, the terminal 2, and the sensor 3 may communicate with each other to transmit and receive signals.

The dispenser 1 may include a plurality of compositions and provide cosmetics by discharging at least one composition when a manufacturing command is received.

Here, the composition may refer to ingredients used in the manufacture of cosmetics, such as foundation, hair dye, and the like. The composition may include raw materials, compounds, and the like used in the manufacture of cosmetics.

The cosmetics may refer to products provided by discharging at least one composition.

For example, when the dispenser 1 is a device for providing the hair dye, the composition may refer to a dyeing material. The dyeing material may include both chemical ingredients and natural ingredients, and may include an oxidation dye representing color, a natural dye, an oxidizing agent, an alkali agent, and auxiliary ingredients for protecting the hair. For example, the oxidation dye may include paraphenylene diamine representing black color, paratrirene diamine representing black brown color, mononitrophenylene diamine representing red color, and the like, and the oxidizing agent may include hydrogen peroxide, carbamide peroxide, sodium perborate, and the like, and the alkali agent may include ammonia, a surfactant, monoethanolamine, and the like.

In addition, the dyeing material may include an acidic dye, a basic dye, an HC dye, a direct dye, and a decolorizing agent, and the like.

The composition may be a compound in which two or more chemical ingredients are mixed, a compound in which two or more natural ingredients are mixed, or a compound in which one or more chemical ingredients and one or more natural ingredients are mixed.

The cosmetics are provided by discharging at least one of the above-described compositions to be suitable for use on a skin or hair of a user, and may be manufactured by discharging any one of a plurality of compositions, or by discharging two or more of the plurality of compositions.

The terminal 2 may receive a command for selecting a target color from the user. The terminal 2 may display at least one sample color and receive a command for selecting the target color through a command for selecting any one of the displayed sample colors. The color selected from among the sample colors may be the target color.

Here, the sample color indicates in advance a color of the skin or hair expected to be developed according to the use of cosmetics, and may refer to an example color. The target color may be a color selected by the user to be developed by the cosmetic to be manufactured.

The terminal 2 is capable of wired/wireless communication and is a device having a display unit and an input unit, and may include a mobile terminal such as a smart phone, a smart watch, a tablet, a personal computer (PC), and the like, but this is merely illustrative, and thus the present disclosure is not limited thereto.

Meanwhile, although the dispenser 1 and the terminal 2 are illustrated as being separated in FIG. 1, the dispenser 1 and the terminal 2 may be integrally formed.

The sensor 3 may measure a color of the skin or hair for which the cosmetics are used. The sensor 3 may be a separate device distinct from the dispenser 1 or the terminal 2, or may be a configuration of the dispenser 1 or the terminal 2.

The sensor 3 may measure a current color of the skin or hair before the cosmetics are used or a result color that is a color of the skin or hair after the cosmetics are used. In addition, the sensor 3 may measure a color of the skin or hair while the cosmetics are being used.

The sensor 3 may be a spectrophotometer. That is, the sensor 3 may measure the color of the skin or hair by obtaining values of three attributes of the skin or hair at a position in contact with the skin or hair or adjacent to the skin or hair.

In the cosmetic providing system according to the embodiment of the present disclosure, the sensor 3 may measure the current color of the hair to transmit current color information to the dispenser 1, and after the terminal 2 receives a command for selecting the target color, the terminal 2 may transmit target color information to the dispenser 1. When the dispenser 1 receives the current color information from the sensor 3 and receives the target color information from the terminal 2, the cosmetic providing system may calculate a cosmetic manufacturing method that causes the skin or hair to be developed from the current color to the target color, and may provide the cosmetics by discharging the composition according to the calculated method of manufacturing the cosmetics.

Figure 2:
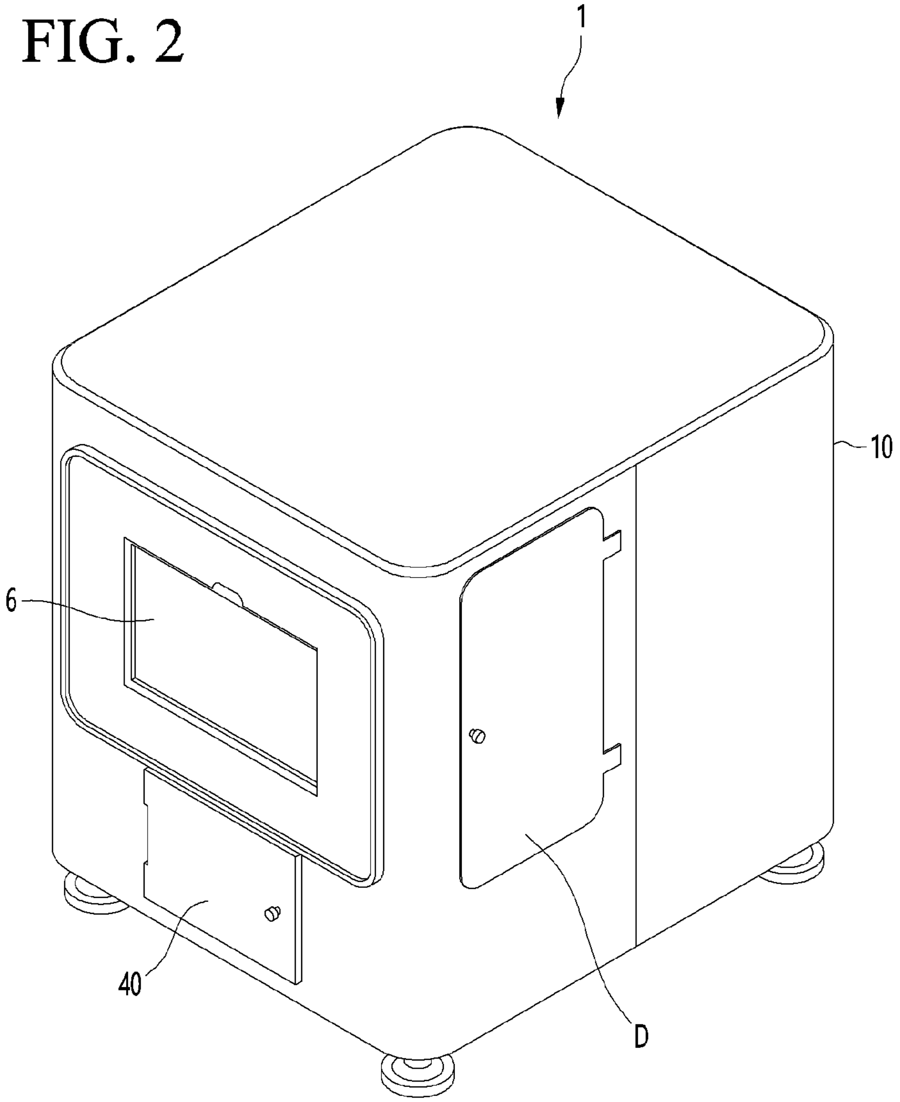
FIG. 2 is a perspective view of a dispenser according to an embodiment of the present disclosure.
Figure 3:
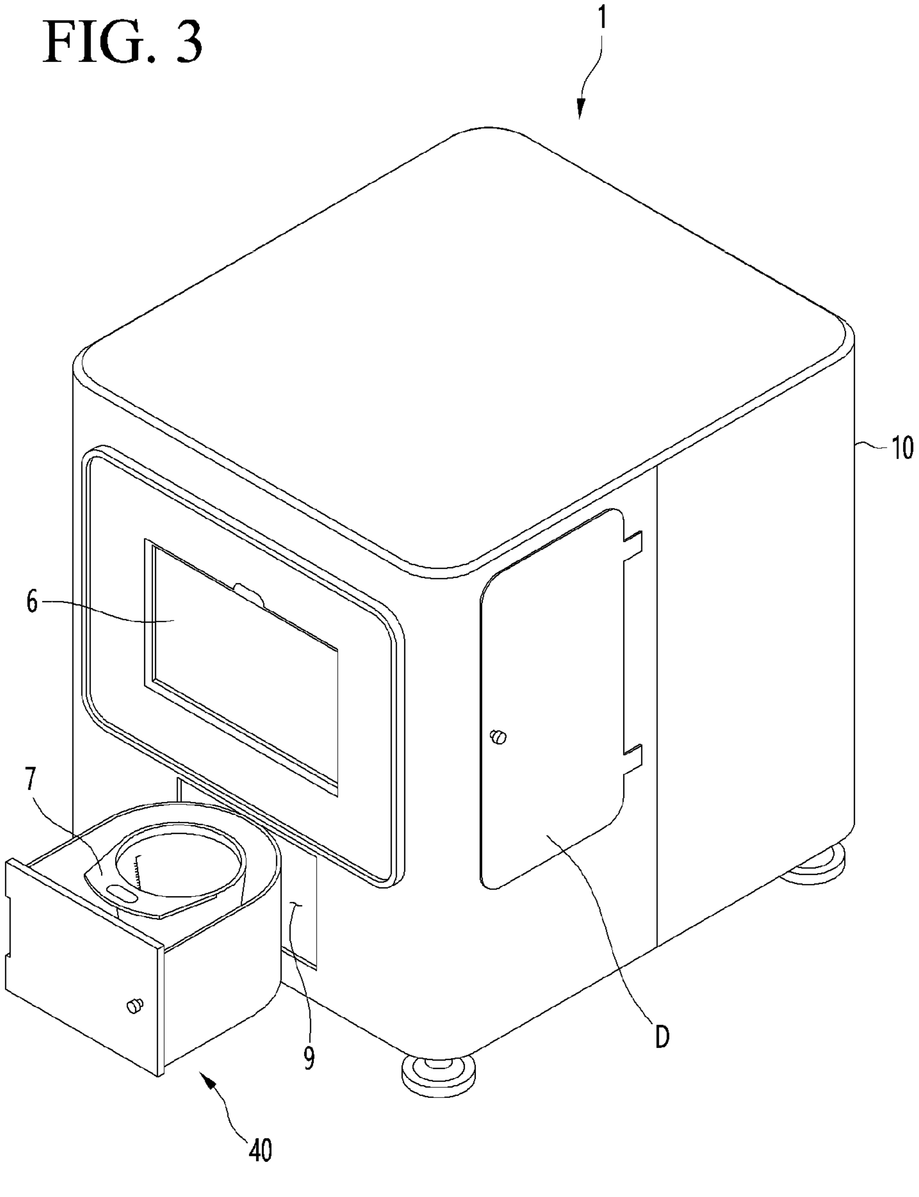
FIG. 3 is a perspective view illustrating a state in which an accommodating body is separated from the dispenser shown in FIG. 2.
Figure 4:
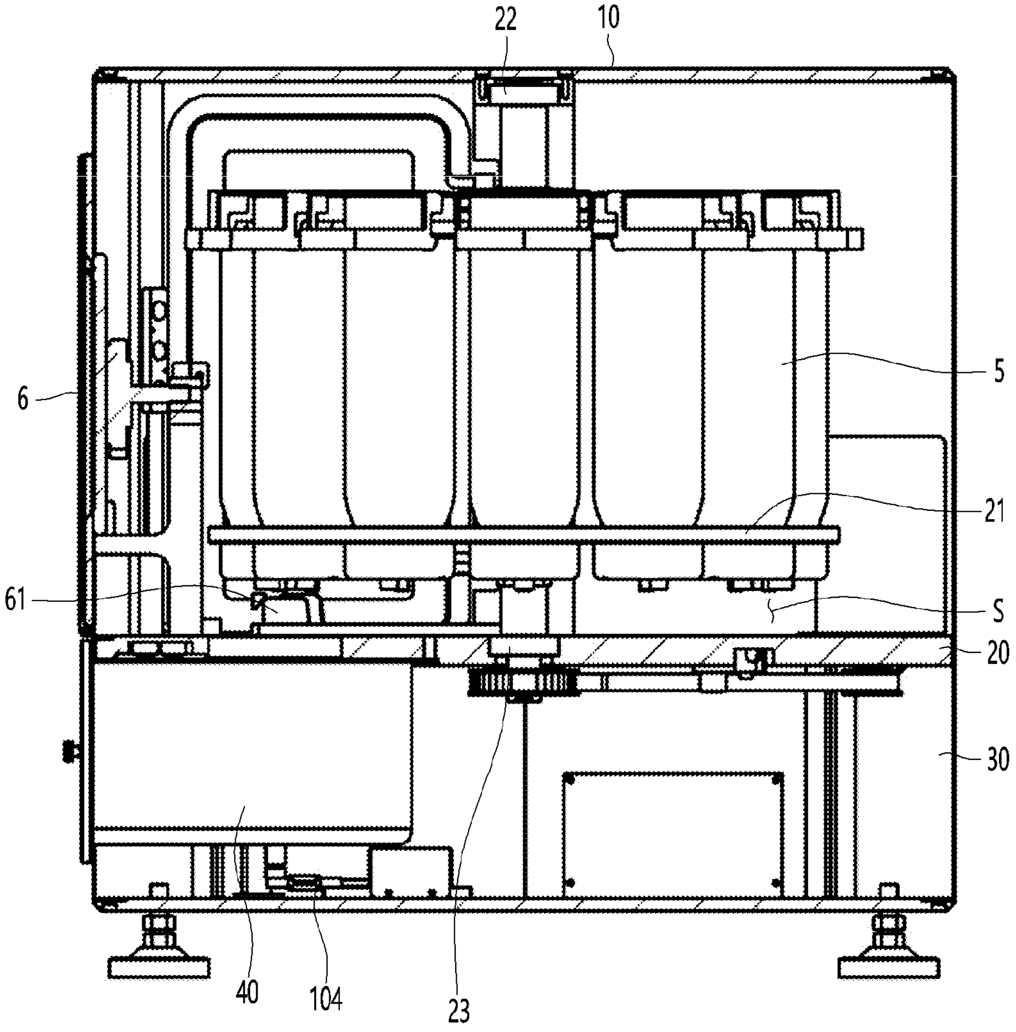
FIG. 4 is a view illustrating the inside of the dispenser according to an embodiment of the present disclosure.

FIG. 2 is a perspective view of a dispenser according to an embodiment of the present disclosure, FIG. 3 is a perspective view illustrating a state in which an accommodating body is separated from the dispenser shown in FIG. 2, and FIG. 4 is a view illustrating the inside of the dispenser according to an embodiment of the present disclosure.

The dispenser 1 may include at least some or all of a housing 10, a plurality of cartridges 5 disposed inside the housing 10 and accommodating a composition, a main body 20 in which the plurality of cartridges 5 are rotatably disposed, a main motor 30 rotating the plurality of cartridges 5, an elevating motor 61 driven when the composition accommodated in the plurality of cartridges 5 is discharged, and an accommodating body 40 in which cosmetics manufactured with the composition discharged from at least one of the plurality of cartridges 5 are provided.

The housing 10 may protect configurations accommodated inside the dispenser 1. The plurality of cartridges 5, the main body 20, the main motor 30, the elevating motor 61, and the accommodating body 40 may be disposed inside the dispenser 1.

The housing 10 may have a hexahedral shape with a space formed therein. Preferably, each face may be a rectangular parallelepiped shape or a cubic shape, but this is merely illustrative, and thus the present disclosure is not limited thereto.

A display unit 6 may be formed on a front surface of the housing 10. The display unit 6 may display various information related to the provision of cosmetics.

In addition, the accommodating body 40 may be mounted on or detached from the housing 10 through the front of the housing 10. The accommodating body 40 may be detached from the housing 10.

A replacement door D may be formed in the housing 10. The replacement door D may be formed on any one of a rear surface (opposite surface of the front surface), a side surface, or an upper surface of the housing 10.

The replacement door D may be opened and closed when the at least one cartridge 5 accommodated in the housing 10 is replaced.

A cross-sectional area of the replacement door D may be larger than that of one cartridge 5. Accordingly, each of the plurality of cartridges 5 may pass through the replacement door D, and the user may easily replace the cartridge 5 through the replacement door D.

The shape of the housing 10 illustrated in the drawings is merely illustrative, and thus the present disclosure is not limited thereto.

An accommodating body space 9 in which the accommodating body 40 is placed may be formed in the housing 10. The accommodating body 40 may be mounted on the housing 10 by being placed in the accommodating body space 9, or may be detached from the housing 10 by being separated from the accommodating body space 9. The accommodating body space 9 may be a passage through which cosmetics made of the composition discharged from the plurality of cartridges 5 are provided to the outside.

The user may place the accommodating body 40 inside the housing 10 or take the accommodating body 40 out to the outside through the accommodating body space 9.

A basket 7 in which the composition discharged from the plurality of cartridges 5 is accommodated may be disposed in the accommodating body 40.

The basket 7 may be placed inside the accommodating body 40 or separated from the accommodating body 40.

In this case, there is an advantage that the user may easily receive cosmetics through the basket 7 and easily wash the accommodating body 40 separated from the housing 10.

Meanwhile, in FIGS. 2 and 3, the accommodating body space 9 and the display unit 6 are illustrated to be formed on the same surface of the housing 10, but according to an embodiment, each of the accommodating body space 9 and the display unit 6 may be formed on a different surface of the housing 10.

As shown in FIG. 4, a plurality of cartridges 5, a mounting body 21 in which each of the plurality of cartridges 5 is mounted, a support body 22 supporting the mounting body 21, a main body 20 supporting at least one of the mounting body 21 and the supporting body 22, a main motor 30 rotating the mounting body 21, an elevating body 65 (see FIG. 5) that moves up and down so as to discharge the composition from any one of the plurality of cartridges 5, an elevating motor 61 that drives the elevating body 65, and the like may be disposed inside the housing 10.

The mounting body 21 has a circular outer circumference, and a plurality of cartridges 5 may be mounted thereon. The plurality of cartridges 5 may be mounted on the mounting body 21 so as to be replaceable. A plurality of mounting holes h1 (see FIG. 8) in which the plurality of cartridges 5 are respectively mounted may be formed in the mounting body 21 to be spaced apart along a circular shape. Each of the plurality of mounting holes h1 may be disposed through each of the plurality of cartridges 5. In particular, in each of the plurality of cartridges 5, the actuator 54 (see FIG. 5) may be disposed downward through each of the plurality of mounting holes h1.

The support body 22 may support the mounting body 21. The support body 22 may support a power transmission shaft 23 formed in a center of the mounting body 21.

One end of the power transmission shaft 23 may be connected to the main motor 30, and the power transmission shaft 23 may be disposed at the center of the mounting body 21.

A part of the power transmission shaft 23 may be disposed so as to pass through a central hole (not shown) formed in the center of the mounting body 21. The power transmission shaft 23 may transmit power of the main motor 30 to the mounting body 21. Therefore, the mounting body 21 may be rotated by the driving of the main motor 30, and thus the plurality of cartridges 5 may be rotated.

The main body 20 may support at least one of the mounting body 21 and the support body 22. In addition, the main body 20 may support the elevating body 65 (see FIG. 5) and the elevating motor 61. In addition, the main body 20 may support a pedestal 25 (see FIG. 10) to be described later.

In addition, a plurality of fixing members 24 may be formed on the mounting body 21. Each of the plurality of fixing members 24 may fix each of the plurality of cartridges 5.

Meanwhile, the dispenser 1 may further include the pedestal 25 that is disposed under the mounting body 21 and accommodates some of the compositions accommodated in the plurality of cartridges 5. That is, the pedestal 25 may be disposed in a space S between the plurality of cartridges 5 and the main body 20. The pedestal 25 may be supported by the main body 20. The pedestal 25 may receive the composition discharged from the plurality of cartridges 5. In particular, the pedestal 25 may accommodate a remaining composition where the composition of the cartridge 5 is not accommodated in the basket 7 and is suspended from the outlet P and then falls.

The pedestal 25 may be disposed at a position overlapping the plurality of cartridges 5 in a vertical direction. However, the pedestal 25 may not be disposed at a position overlapping the basket 7 in the vertical direction. This is because the composition discharged from the cartridge 5 disposed at the position overlapping the basket 7 in the vertical direction should be accommodated in the basket 7 rather than the pedestal 25.

In addition, the accommodating body 40 may be disposed inside the housing 10, and a weight sensor 104 may be installed under an arrangement space of the accommodating body 40. When the accommodating body 40 is mounted on the housing 10, the weight sensor 104 may sense a weight of the basket 7 disposed inside the accommodating body 40. This will be described in detail with reference to FIG. 17.

The dispenser 1 may further include a control unit 110 (see FIG. 18) for controlling the main motor 30 and the elevating motor 61 so that the composition is discharged from at least one of the plurality of cartridges 5 according to a cosmetic manufacturing method.

The control unit 110 may be disposed inside the housing 10 adjacent to the display unit 6, but this is merely illustrative, and the control unit 110 may be disposed at an arbitrary position in the housing 10.

The control unit 110 may receive cosmetic-related information from a communication unit 103 (see FIG. 18) described later, or may receive the cosmetic-related information from the display unit 6 composed of a touch panel to calculate the cosmetic manufacturing method.

The cosmetic manufacturing method may include information on a type of the composition to be discharged and information on an amount of the composition to be discharged.

The control unit 110 may control the main motor 30 and the elevating motor 61 so that the composition is discharged from the at least one cartridge 5 by an amount determined according to the cosmetic manufacturing method.

The main motor 30 generates a driving force, and the driving force generated from the main motor 30 is transmitted to the mounting body 21 through the power transmission shaft 23, so that the mounting body 21 may rotate. The control unit 110 may control the main motor 30 to position the cartridge 5 accommodating the composition to be discharged in a discharging area.

Here, the discharging area may refer to a position where the cartridge 5 accommodating the composition to be discharged is disposed side by side with the basket 7 in the vertical direction.

When the composition to be discharged is positioned in the discharging area, the control unit 110 may control the elevating motor 61 to control a discharging amount of the composition.

The control unit 110 may control at least one of an elevating height and an elevating speed of the elevating body 65 (see FIG. 5) through the elevating motor 61 to adjust the discharge amount of the composition.

Figure 5:
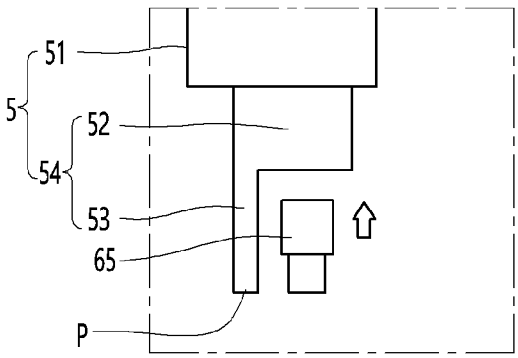
FIG. 5 is a view illustrating a part of a cartridge and an elevating body in a side surface direction according to an embodiment of the present disclosure.
Figure 6:
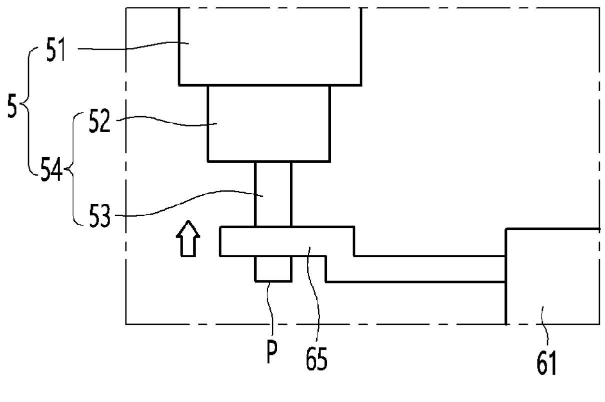
FIG. 6 is a view illustrating a part of the cartridge, the elevating body, and an elevating motor according to an embodiment of the present disclosure in a front direction.
Figure 7:
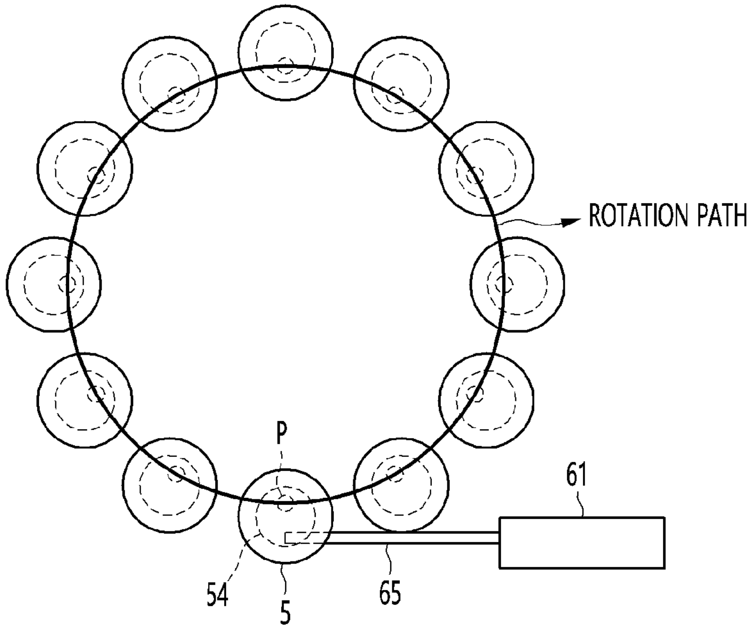
FIG. 7 is a plan view illustrating a rotation path and the elevating motor of the cartridge according to an embodiment of the present disclosure.

FIG. 5 is a view illustrating a part of the cartridge and the elevating body in a side surface direction according to an embodiment of the present disclosure, FIG. 6 is a view illustrating a part of the cartridge, the elevating body, and the elevating motor according to an embodiment of the present disclosure in the front direction, and FIG. 7 is a plan view illustrating a rotation path and the elevating motor of the cartridge according to an embodiment of the present disclosure.

The elevating motor 61 may move up or down the elevating body 65.

The elevating body 65 may pressurize any one of the cartridges 5 during moving up, and may be separated from the cartridge 5 being pressurized during moving down. The elevating body 65 may pressurize the cartridge 5, in particular the actuator 54 to discharge the composition accommodated in the cartridge 5.

The elevating body 65 may move up and down so that the composition is discharged from any one of the plurality of cartridges 5. The elevating body 65 may move up or down to selectively drive the actuator 54.

The elevating motor 61 may be mounted on the main body 20. The elevating body 65 may be disposed in a space S between the plurality of cartridges 5 and the main body 20.

The elevating body 65 may have a straight shape. That is, the elevating body 65 may not be bent. Accordingly, the production process of the elevating body 65 may be facilitated.

The elevating body 65 may be disposed to be deviated from a rotation path on which the plurality of cartridges 5 rotate. According to an embodiment, the elevating motor 61 may be installed closer to the front of the housing 10 than the mounting body 21, and the elevating body 65 may be connected to a side surface of the elevating motor 61.

In this case, it is possible to minimize a problem that at least a part of the plurality of cartridges 5 is caught on the elevating body 65 when the plurality of cartridges 5 rotate. For example, when at least a part of an elevating path of the elevating body 65 interferes with the rotation path on which the plurality of cartridges 5 rotate, a problem may occur in which the cartridge 5 and the elevating body 65 collide with each other and are damaged when a malfunction occurs. However, as in the present disclosure, when the elevating body 65 is disposed so that the elevating path of the elevating body 65 does not overlap the rotation path on which the plurality of cartridges 5 rotate, it is possible to minimize a problem of interference between the elevating body 65 and the cartridge 5. At this point, the elevating path may be a path on which the elevating body 65 moves up and down, and the rotation path may be a path on which each outlet P of the plurality of cartridges 5 moves when the plurality of cartridges 5 rotate and may have a virtual circular shape.

In addition, since the elevating body 65 is disposed so as to be deviated from the rotation path on which the plurality of cartridges 5 rotate, it is possible to minimize a problem that the composition suspended from the outlet P of the cartridge 5 sticks to the elevating body 65 while rotating. That is, there is an advantage that a problem of contamination of the elevating body 65 is minimized.

A container 51 in which the composition is accommodated and the actuator 54 for discharging the composition accommodated in the container 51 may be formed in each of the plurality of cartridges 5, and a discharging body 53 having an outlet P for the composition accommodated in the container 51 to move to the outside and an operation body 52 that opens the outlet P according to pressure may be formed in the actuator 54. The outlet P may be a passage through which the composition stored in the container 51 moves to the outside.

As shown in FIGS. 5 to 7, the outlet P may be closed in a state in which the elevating body 65 is spaced apart from the operation body 52, and in this case, the composition may not be discharged from the container 51.

Meanwhile, when pressure is applied to the operation body 52 after the elevating body 65 moves up and is in contact with the operation body 52, the outlet P may be opened. In particular, as the pressure applied to the operation body 52 increases, an opening area of the outlet P may increase. That is, as the pressure applied by the elevating body 65 to the operation body 52 increases, an amount of the composition discharged from the outlet P increases, and as the pressure applied by the elevating body 65 to the operation body 52 decreases, the amount of the composition discharged from the outlet P may decrease.

As described above, in the dispenser 1 according to the embodiment of the present invention, the elevating body 65 may pressurize the operation body 52 to discharge the composition. In this case, the composition may include all of a liquid type, a cream type, an oil type, and the like. That is, the dispenser 1 may discharge a liquid-type composition, a cream-type composition, or an oil-type composition accommodated in the cartridge 5. As described above, there is an advantage that the dispenser 1 according to the embodiment of the present invention may discharge the composition regardless of a state of ingredients of the composition.

Meanwhile, this cartridge 5 may be fixed by the fixing member 24.

Figure 8:
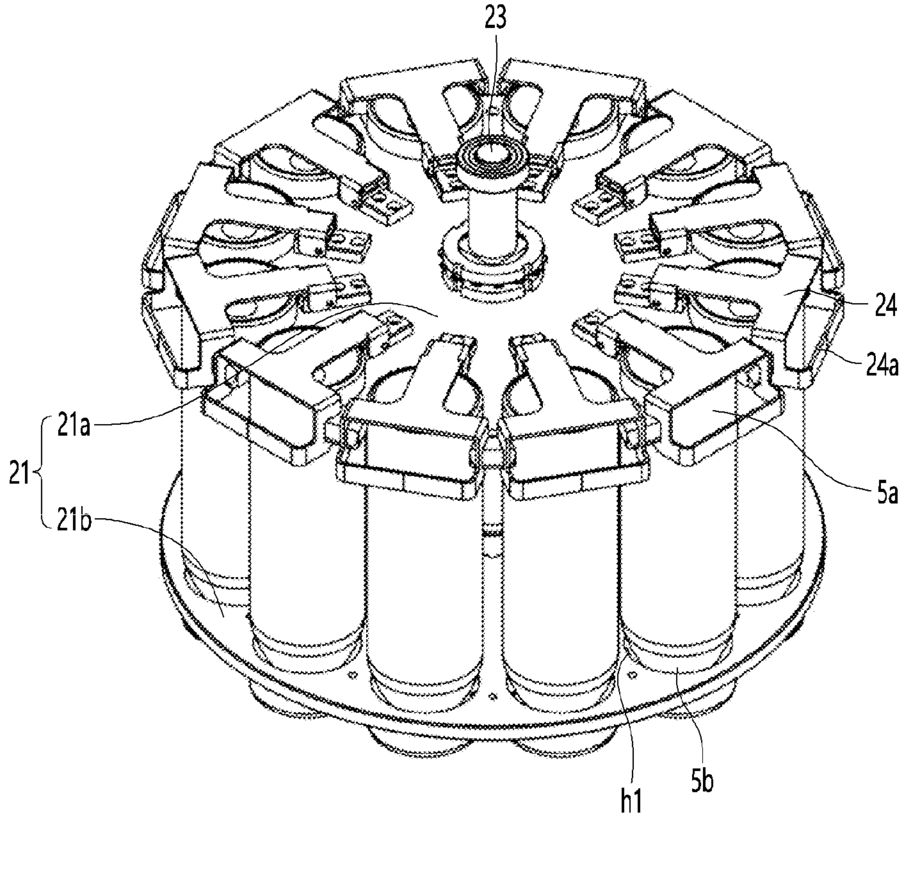
FIG. 8 is a view illustrating a plurality of cartridges and a mounting body according to an embodiment of the present disclosure.

FIG. 8 is a view illustrating a plurality of cartridges and a mounting body according to an embodiment of the present disclosure.

The mounting body 21 may include an upper mounting body 21*a* in which a plurality of fixing members 24 are formed and a lower mounting body 21*b* in which a plurality of mounting holes h1 are formed.

An upper portion 5*a* of each of the plurality of cartridges 5 may be fixed by the plurality of fixing members 24, and a lower portion 5*b* of each of the plurality of cartridges 5 may be fixed by the plurality of mounting holes h1.

The fixing member 24 may fix the plurality of cartridges 5 in a form surrounding the upper portion 5*a* of each of the plurality of cartridges 5. Specifically, each of the plurality of fixing members 24 may be connected to the upper mounting body 21*a* by a spring, and when a lever 24*a* of the fixing member 24 is pulled outward, an elastic force of the spring is weakened, so that the fixing member 24 may be lifted up to secure a space in which the cartridge 5 may be replaced, and when the lever 24*a* is pressed inward, the elastic force of the spring is strong and the fixing member 24 is fixed, so that the cartridge 5 may be fixed.

In this case, since the cartridge 5 surrounding the upper portion 5*a* of the cartridge 5 may be fixed by the elastic force of the spring connected to the fixing member 24, a structure for applying pressure to each of the cartridges 5 so as to fix the cartridge 5 is unnecessary, so that an increase in volume due to the fixing structure of the cartridge 5 may be minimized. That is, the dispenser 1 may be miniaturized through the fixing structure of the cartridge 5 as described above, and accordingly, there is an advantage that it is possible to reduce the manufacturing cost.

Figure 9:
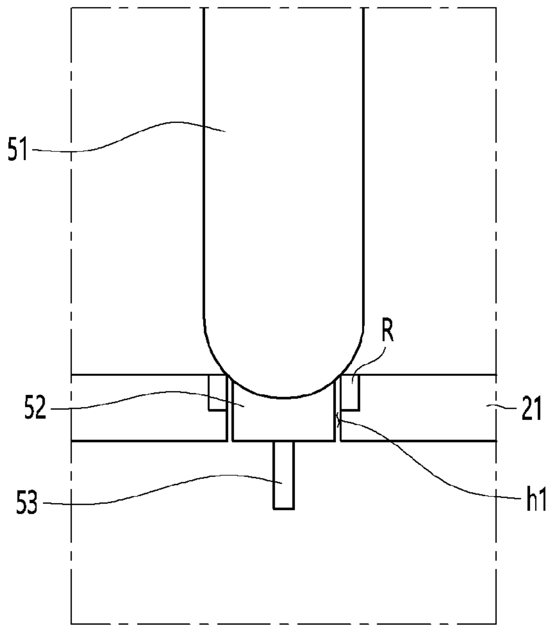
FIG. 9 is an enlarged view illustrating a part of the cartridge and the mounting body according to an embodiment of the present disclosure.

FIG. 9 is an enlarged view illustrating a part of the cartridge and the mounting body according to an embodiment of the present disclosure.

The mounting hole h1 through which a part of the cartridge 5 passes may be formed in the mounting body 21, particularly the lower mounting body 21*b*. The lower portion 5*b* of each of the plurality of cartridges 5 may pass through each of the plurality of mounting holes h1 formed in the mounting body 21. For example, the operation body 52 and the discharge body 53 may pass through the mounting hole h1.

A rubber ring R may be disposed in each of the plurality of mounting holes h1.

The rubber ring R may be disposed around the plurality of mounting holes h1. The rubber ring R may be disposed on the mounting body 21 along a circumference of each of the plurality of mounting holes h1. The rubber ring R may be disposed in a region where the cartridge 5 is in contact with the mounting body 21.

A plurality of grooves for disposing the rubber ring R may be formed in the upper portion of the mounting body 21.

As described above, when the rubber ring R is disposed around the mounting hole h1 through which a part of the cartridge 5 passes, a depth at which the cartridge 5 passes through the mounting hole h1 may be flexibly adjusted, and accordingly, there is an advantage that the cartridge 5 may be mounted on the mounting body 21 even though a height of the cartridge 5 is made slightly greater than the design. Specifically, when the height is produced greater than the design due to an occurrence of an error on the height when the cartridge 5 is produced, there may be a problem that it is difficult to mount the cartridge 5 between the upper mounting body 21*a* and the lower mounting body 21*b*, and similarly, when an error with respect to a radius of the cartridge 5 occurs, there may be a problem that the cartridge is not well inserted into the mounting hole h1. In this case, when the rubber ring R with elastic force is disposed around the mounting hole h1 through which a part of the cartridge 5 passes, the height error or the error with respect to the radius is compensated to some extent, and thus there is an advantage of helping the cartridge 5 to be mounted.

The pedestal 25 may receive the composition discharged from the cartridge 5 under the plurality of cartridges 5. That is, when the composition suspended at the outlet P of the cartridge 5 is not discharged to the basket 7, the pedestal 25 receives the composition suspended at the outlet P instead of the dispenser 1 in order to improve the ease of cleaning and management.

According to an embodiment of the present disclosure, the pedestal 25 may have a circular shape. That is, one pedestal 25 with the circular shape may be disposed under the plurality of cartridges 5. However, in this case, it is difficult to separate the pedestal 25, which may cause user inconvenience during washing.

According to another embodiment of the present disclosure, the pedestal 25 may have an arc shape. That is, the dispenser 1 may include a plurality of arc-shaped pedestals 25. The plurality of pedestals 25 may receive the composition discharged from the cartridge 5 under the plurality of cartridges 5.

The plurality of arc-shaped pedestals 25 may be disposed under a plurality of cartridges 5 along a virtual circle. In this case, it is easy to separate the pedestal 25, and thus there is an advantage that user inconvenience is minimized during washing.

Figure 10:
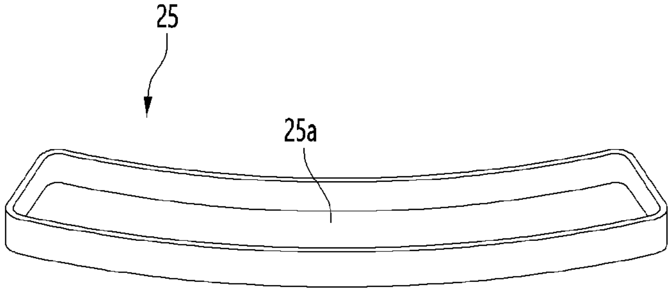
FIG. 10 is an exemplary view illustrating an arc-shaped pedestal according to an embodiment of the present disclosure.

FIG. 10 is an exemplary view illustrating an arc-shaped pedestal according to an embodiment of the present disclosure.

As shown in FIG. 10, the pedestal 25 may have an arc shape. The arc length of the pedestal 25 may vary.

A bottom surface 25*a* that receives the composition away from the cartridge 5 may be formed in the pedestal 25. An outer periphery of the bottom surface 25*a* is formed with a side surface protruding upward, and the side surface may minimize a case in which the composition falls out of the pedestal 25.

Figure 11:
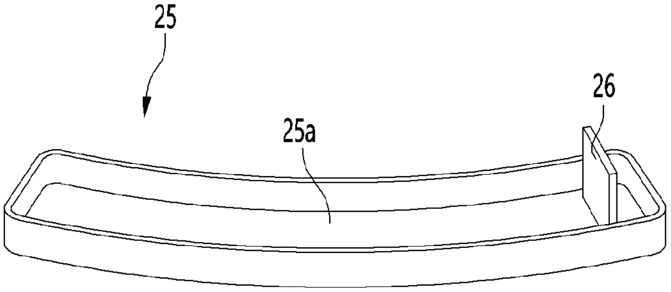
FIG. 11 is an exemplary view illustrating a state in which a cutter is formed on a pedestal shown in FIG. 10.

FIG. 11 is an exemplary view illustrating a state in which a cutter is formed on the pedestal shown in FIG. 10.

As shown in FIG. 11, a cutter 26 may be formed on the pedestal 25. That is, according to the embodiment, at least one of the plurality of pedestals 25 may be formed with a cutter 26 protruding upward. The cutter 26 may be formed to protrude upward from the bottom surface 25*a*.

The cutter 26 may drop the composition suspended from the outlet P of the rotating cartridge 5 to the bottom surface 25*a* of the pedestal 25. Specifically, when the cartridge 5 rotates, the composition suspended from the outlet P of the cartridge 5 may be caught at the cutter 26, and the composition caught at the cutter 26 may flow down along the cutter 26 and may be stacked on the bottom surface 25*a*. That is, the cutter 26 may guide the composition that is not accommodated in the basket 7 to the pedestal 25 after being discharged from the cartridge 5, and accordingly, there is an advantage that it is possible to minimize a case in which the composition falls and becomes contaminated anywhere in the dispenser 1.

Figure 12:
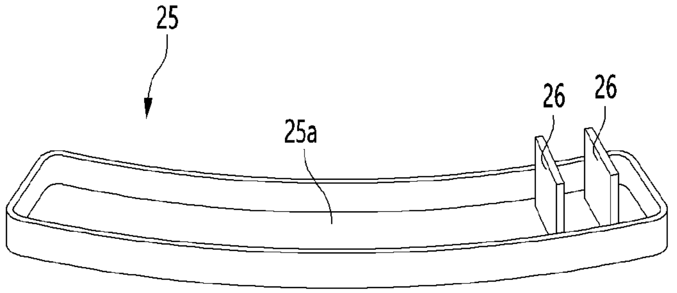
FIG. 12 is an exemplary view illustrating a state in which a plurality of cutters are formed on the pedestal shown in FIG. 10.

FIG. 12 is an exemplary view illustrating a state in which a plurality of cutters are formed on the pedestal shown in FIG. 10.

As shown in FIG. 12, a plurality of cutters 26 may be formed on the pedestal 25. That is, a plurality of cutters 26 may be formed on one pedestal 25. In the example of FIG. 12, the heights of the plurality of cutters 26 may be the same.

As described above, when the plurality of cutters 26 are formed on one pedestal 25, there is an advantage that the composition stacked on the pedestal 25 may be dispersed.

Specifically, when the cutter 26 is formed on the pedestal 25, the composition may be intensively stacked around the cutter 26. Accordingly, when only one cutter 26 is formed on the pedestal 25, the composition may be intensively stacked around the cutter, causing the composition to overflow out of the pedestal 25.

Accordingly, when a plurality of cutters 26 are formed on the pedestal 25, it is possible to minimize the problem of excessively accumulating the composition at a specific location.

Figure 13:
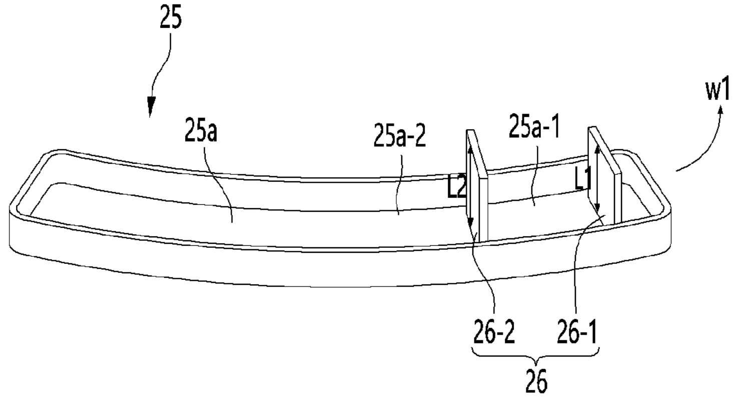
FIG. 13 is an exemplary view illustrating a state in which the plurality of cutters having different heights are formed on the pedestal shown in FIG. 10.

FIG. 13 is an exemplary view illustrating a state in which the plurality of cutters having different heights are formed on the pedestal shown in FIG. 10.

As shown in FIG. 13, the plurality of cutters 26 may be formed on the pedestal 25, and in this case, the heights of the plurality of cutters 26 may be different from each other. That is, the plurality of cutters 26 may have different heights. Specifically, the plurality of cutters 26 may be formed on the pedestal 25, the plurality of cutters 26 may include a first cutter 26-1 and a second cutter 26-2, and a vertical length L1 of the first cutter 26-1 may be different from a vertical length L2 of the second cutter 26-2.

In particular, the cutter 26 having a higher height may be disposed along a rotational direction w1 of the cartridge 5. For example, the vertical length L1 of the first cutter 26-1 may be shorter than the vertical length L2 of the second cutter 26-2.

In this case, the plurality of cutters 26 may cut the composition suspended from the cartridge 5 stepwise and drop the composition on the bottom surface 25*a*, and thus there is an advantage that the composition stacked on the pedestal 25 may be more effectively dispersed.

That is, when the cartridge 5 rotates, the first cutter 26-1 may drop a part of the composition suspended on the specific cartridge 5 onto a first region 25*a*-1, and the second cutter 26-1 may drop a part of the remaining composition dropped by the first cutter 26-1 onto a second region 25*a*-2.

As described above, when a plurality of cutters having different vertical lengths are formed on the pedestal, there is an advantage that the composition is uniformly stacked on the pedestal.

Figure 14:
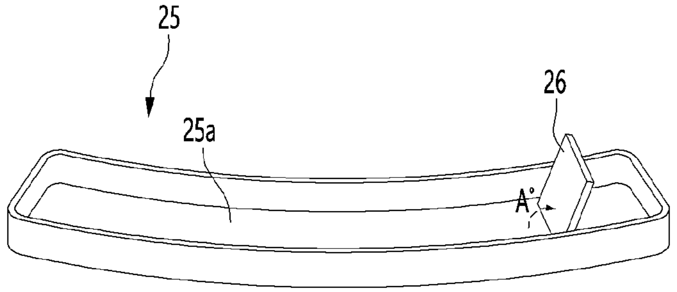
FIG. 14 is an exemplary view illustrating a state in which the cutter is formed in an inclined form on the pedestal shown in FIG. 10.

FIG. 14 is an exemplary view illustrating a state in which the cutter is formed in an inclined form on the pedestal shown in FIG. 10.

As shown in FIG. 14, the cutter 26 may be formed on the pedestal 25 in an inclined shape. That is, as shown in FIG. 14, the cutter 26 may be formed to be inclined at a predetermined angle (e.g., A°) with respect to the pedestal 25, and at this point, the inclined angle may be greater than 0° and less than 90°, or greater than 90° and less than 180°. When A° is 90°, it may be the same as the cutter 26 shown in FIGS. 11 to 13.

As shown in FIG. 14, the cutter 26 may be inclined toward a rotational direction of the cartridge 5, or may be inclined toward a direction opposite to the rotational direction of the cartridge 5.

In this case, as the cartridge 5 rotates, a contact area of the composition suspended in a specific direction with the cutter 26 increases, so that there is an advantage that the composition is more efficiently accommodated in the pedestal 25.

Figure 15:
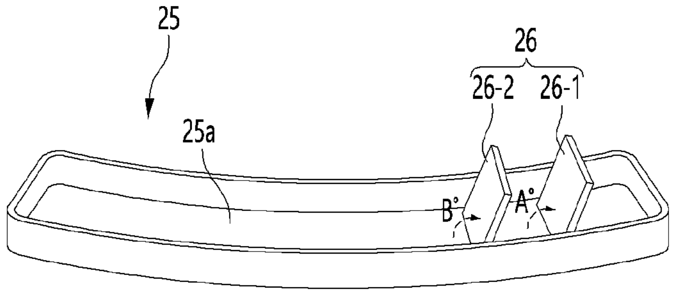
FIG. 15 is an exemplary view illustrating a state in which the plurality of cutters inclined on the pedestal shown in FIG. 10 are formed.

FIG. 15 is an exemplary view illustrating a state in which the plurality of cutters inclined on the pedestal shown in FIG. 10 are formed.

As shown in FIG. 15, when a plurality of cutters 26 are formed on the pedestal 25, angles at which each of the plurality of cutters 26 are inclined may be the same or different. Specifically, a plurality of cutters 26 may be formed on the pedestal 25, the plurality of cutters 26 may include a first cutter 26-1 and a second cutter 26-2, and an inclination angle (e.g., A°) of the first cutter 26-1 may be the same as or different from an inclination angle (e.g., B°) of the second cutter 26-2.

When a plurality of cutters 26 inclined at various angles are formed on the pedestal 25 as described above, an area in which the composition hanging at various angles collides with the cutter 26 is widened, and thus there is an advantage that the composition is more efficiently accommodated to the pedestal 25.

Meanwhile, in FIGS. 11 to 15, an upper end of the cutter 26 may be lower than the outlet P of the cartridge 5 or formed at the same height.

Figure 16:
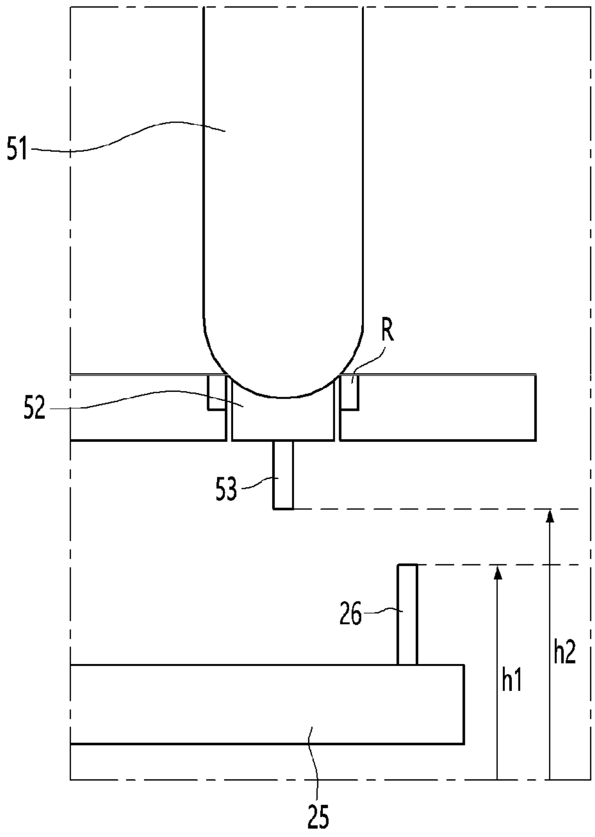
FIG. 16 is a view illustrating a part of the pedestal, a container, and the mounting body shown in FIG. 13.

FIG. 16 is a view illustrating a part of the pedestal, a container, and the mounting body shown in FIG. 11. As shown in FIG. 16, a height h1 of the upper end of the cutter 26 may be lower than a height h2 of an outlet of the cartridge 5. In addition, the height h1 of the upper end of the cutter 26 may be equal to the height h2 of the outlet of the cartridge 5.

Accordingly, when the cartridge 5 rotates, the cutter 26 does not collide with the cartridge 5, and only the composition suspended on the cartridge 5 may be dropped.

Meanwhile, in FIG. 16, the pedestal 25 shown in FIG. 11 is exemplified, but the present disclosure is not limited thereto. That is, in a case of the pedestal 25 shown in any one of FIGS. 12 to 15, the height h1 of the upper end of the cutter 26 formed on the pedestal 25 may be the same as the height h2 of the outlet of the cartridge 5. or may be lower.

Meanwhile, nevertheless, the composition discharged from the cartridge 5 may fall on areas other than the pedestal 25 and the basket 7. In particular, the composition may be discharged around the basket 7, or the composition of the basket 7 may overflow and fall on the periphery. As described above, the housing body 40 on which the basket 7 is disposed may be detachably formed from the dispenser 1 so that the composition around the basket 7 may be easily cleaned.

Figure 17:
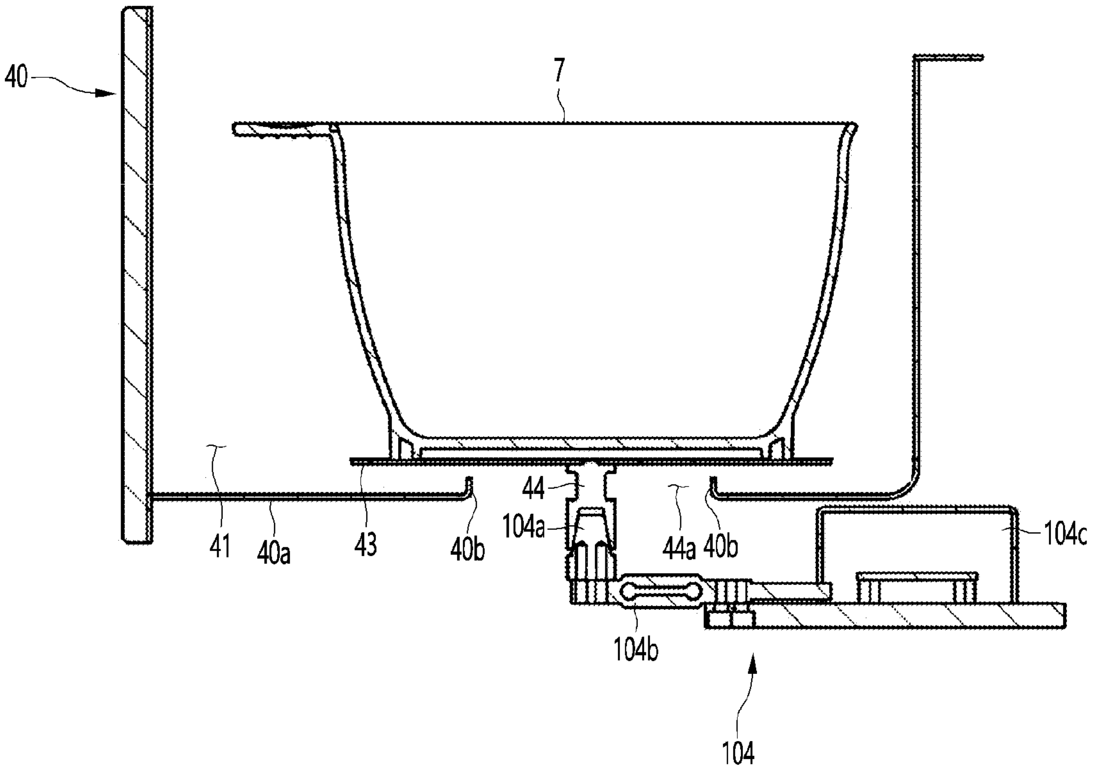
FIG. 17 is a view illustrating an accommodating body, a basket, and a weight sensor according to an embodiment of the present disclosure.

FIG. 17 is a view illustrating an accommodating body, a basket, and a weight sensor according to an embodiment of the present disclosure.

The accommodating body 40 according to an embodiment of the present disclosure may be formed so as to be able to deposit and withdraw from the housing 10. Specifically, the accommodating body 40 may be raised to the accommodating body space 9 or separated from the accommodating body space 9.

An accommodation space 41 in which the basket 7 is placed may be formed in the accommodating body 40. A user may place the basket 7 in the accommodation space 41 or remove the basket 7 from the accommodation space 41.

Specifically, a plate 43 on which the basket 7 is seated may be formed on the accommodating body 40, and the plate 43 may be formed with a connecting member 44 that is in contact with the weight sensor 104 when the housing 40 is disposed in the housing 10. The connection member 44 may be formed to protrude from a lower surface of the plate 43.

The plate 43 may be separated from the accommodating body 40. A door opened and closed by the user may be formed on a front surface of the accommodating body 40.

The accommodating body 40 may be placed in the accommodating body space 9 in a state in which the plate 43 is separated, and then the accommodating body 40 may be installed so that the plate 43 is in contact with the weight sensor 104 through the door. Then, after the plate 43 is separated from the weight sensor 104, the accommodating body 40 may be separated from the accommodating body space 9.

The weight sensor 104 may include a load transmission unit 104*a* that receives a load of a weight measurement target, a load cell 104*b* that measures the load of the load transmission unit 104*a*, and a load cell controller 104*c* that controls the load cell 104*b*.

A connection hole 44*a* through which the connection member 44 passes may be formed in the base 40*a* that is the bottom surface of the accommodating body 40. That is, the accommodating body 40 may be formed with the connection hole 44*a* through which the connection member 44 that transmits a load of the plate 43 on which the basket 7 is placed to the weight sensor 104 so that the weight of the basket 7 is sensed by the weight sensor 104 passes. The connection member 44 may be disposed so as to pass through the connection hole 44*a* and be in contact with the load transmission unit 104*a*. Accordingly, there is an advantage that the weight of the basket 7 may be measured even when the accommodating body 40 is formed to be detachable from the housing 10.

Meanwhile, a protrusion 40*b* protruding upward from the base 40*a* may be formed around the connection hole 44*a* of the accommodating body 40. The protrusion 40*b* may have an upper end lower than the lower surface of the plate 43 or may be formed at the same height.

The protrusion 40*b* may minimize a case in which the composition overflows from the basket 7 or the composition discharged out of the basket 7 passes through the connection hole 44*a* and falls around the weight sensor 104.

In addition, a horizontal cross-sectional area of the plate 43 may be greater than or equal to a horizontal cross-sectional area of the connection hole 44*a*.

Next, a method of operating the above-described cosmetic providing system will be described.

Figure 18:
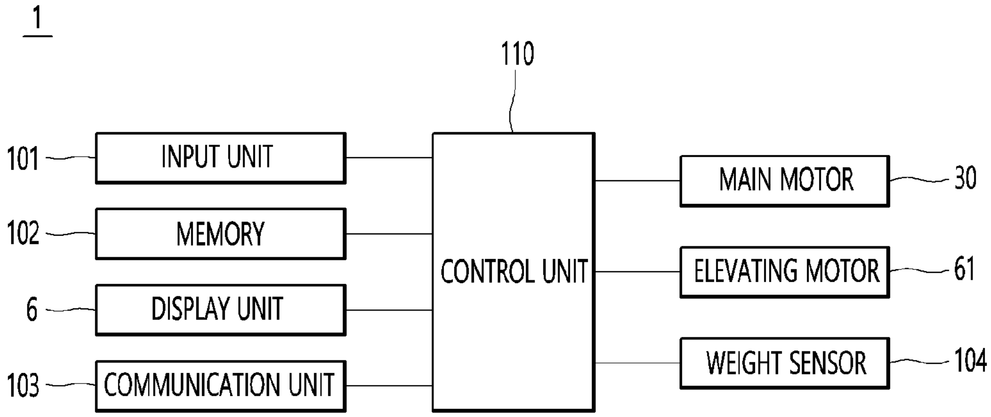
FIG. 18 is a control block diagram of the dispenser according to an embodiment of the present disclosure.

FIG. 18 is a control block diagram of the dispenser according to an embodiment of the present disclosure.

The dispenser 1 may include at least some or all of an input unit 101, a memory 102, a display unit 6, a communication unit 103, a main motor 30, an elevating motor 61, a weight sensor 104, and a control unit 110.

The input unit 101 may receive various input commands related to cosmetics manufacturing. For example, the input unit 101 may receive at least one of an input command for initializing the dispenser 1, an input command for manually setting cosmetics to be manufactured, an input command for checking/replacing a remaining amount of the cartridge, an input command for checking a weight of the cosmetics, and an input command for checking a user history. However, this is merely illustrative, and the input unit 101 may receive various input commands related to the cosmetics manufacturing.

In addition, the input unit 101 may receive an input command for selecting the target color or the like. That is, the input unit 101 of the dispenser 1 may directly receive an input command received through an input unit 201 provided in the terminal 2. Conversely, the input unit 201 of the terminal 2 may receive an input command received through the input unit 101 provided in the dispenser 1.

The input unit referred to below may refer to at least one of the input unit 101 of the dispenser 1 and the input unit 201 of the terminal 2.

The memory 102 may store various information related the manufacture of cosmetics.

Specifically, the memory 102 may store a cosmetic manufacturing database.

Here, the cosmetic manufacturing database may refer to a cosmetic manufacturing algorithm, a cosmetic manufacturing formula, and the like that calculate a composition ratio of a composition for causing the current color to be developed into the target color.

The cosmetic manufacturing method may be calculated based on the cosmetic manufacturing database, and the cosmetic manufacturing method may include information on a type and weight of the composition discharged from the plurality of cartridges 5 mounted in the dispenser 1.

The control unit 110 may calculate the cosmetic manufacturing method based on the cosmetic manufacturing database. The control unit 110 may calculate the cosmetic manufacturing method including the type of the composition to be included in the cosmetics to be used for the skin or hair, the composition ratio of the composition when there are a plurality of types, information on a total weight of the cosmetics, and the like based on the cosmetic manufacturing database. The control unit 110 may acquire the type of the composition and the component ratio of the compositions through the cosmetic manufacturing algorithm or the cosmetic manufacturing formula. The control unit 110 may receive weight information of the cosmetics through the input unit.

The display unit 6 may display various information related to the manufacture of cosmetics, such as a state of the dispenser 1, a state of the cartridge 5, and cosmetic information.

The communication unit 103 may transmit/receive a signal to/from at least one of the sensor 3 and the terminal 2. For example, the communication unit 103 may receive the current color information of the skin or hair from the sensor 3, and may receive the target color information from the terminal 2. In addition, the communication unit 103 may transmit information on cosmetics that may be manufactured based on the composition mounted on the dispenser 1 to the terminal 2, and the terminal 2 may display a simulation.

The main motor 30 may rotate the mounting body 21 on which the plurality of cartridges 5 are mounted. The main motor 30 may rotate the mounting body 21 so that the cartridge accommodating the discharged composition is positioned in the discharging area. a predetermined amount of the composition The control unit 110 may control the main motor 30 so that the cartridge accommodating the composition discharged according to the cosmetic manufacturing method is positioned in the discharging area, and may control the elevating motor 61 so that the composition in an amount determined by the cosmetic manufacturing method is discharged from the cartridge positioned in the discharging area.

When the composition to be discharged is in plural, the control unit 110 may control the main motor 30 so that each of the plurality of cartridges is sequentially positioned in the discharging area.

The elevating motor 61 may move up and down the elevating body 65 so that the composition is discharged from the cartridge positioned in the discharging area.

When the elevating body 65 is elevating, the elevating body 65 pressurizes the actuator 54 of the cartridge 5 positioned in the discharging area, so that the composition accommodated in the cartridge 5 may be discharged. When the elevating body 65 moves down, the pressure applied by the elevating body 65 to the actuator 52 is reduced and the amount of the composition discharged to the cartridge 5 may be reduced, and when the elevating body 65 is spaced apart from the actuator 52, the discharging of the composition may be stopped.

The control unit 110 may control the elevating motor 61 according to the weight information included in the cosmetic manufacturing method. For example, when the cosmetic manufacturing method includes information for mixing 10 g of a first composition accommodated in the first cartridge and 10 g of a second composition accommodated in the second cartridge, the control unit 110 may control the elevating motor 61 so that 10 g of the first composition is discharged after positioning the first cartridge in the discharging area through the main motor 30, and may control the elevating motor 61 so that 10 g of the second composition is discharged after positioning the second cartridge in the discharging area.

The control unit 110 may calculate the amount of the composition discharged from the discharging area through the weight sensor 104. The weight sensor 104 may be provided below the accommodating body space 9.

The weight sensor 104 may measure the weight of the basket 7 placed on the accommodating body 40. The basket 7 may contain the composition discharged from the cartridge 5. The control unit 110 may calculate the weight of the composition discharged from each cartridge 5 based on a change in weight that occurs as the composition is discharged. For example, when a weight measured by the weight sensor 104 before the composition is discharged is A g, a weight measured by the weight sensor 104 after the first composition is discharged is B g, and a weight measured by the weight sensor 104 after the second composition is discharged is C g, the control unit 110 may calculate the weight of the basket 7 as A g, calculate the weight of the discharged first composition by the calculation of (B-A) g, and calculate the weight of the discharged second composition by the calculation of (C-B-A) g.

The control unit 110 may control the overall operation of the dispenser 1. The control unit 110 may control at least some or all of the input unit 101, the memory 102, the display unit 6, the communication unit 103, the main motor 30, the elevating motor 61, the weight sensor 104, and the control unit 110.

According to an embodiment, the control unit 110 receives the current color information from the sensor 3 and receives the target color information from the terminal 2, so that the control unit 110 may calculate a cosmetic manufacturing method that causes the skin or hair to develop a color from the current color to the target color, and may provide cosmetics by discharging the compositions accommodated in the plurality of cartridges 5 according to the calculated cosmetic manufacturing method.

For example, when the current color is a first color and the target color is a second color, the control unit 110 may calculate a cosmetic manufacturing method of mixing the first composition and the second composition in a ratio of A:B. When the current color is the first color and the target color is a third color, the control unit 110 may calculate a cosmetic manufacturing method of mixing the first composition and the third composition in a ratio of C:D. When the current color is a fourth color and the target color is the second color, the control unit 110 may calculate a cosmetic manufacturing method of mixing the second composition, the fourth composition, and the fifth composition in a ratio of E:F:G That is, the type and weight of the composition used in manufacturing cosmetics may be different depending on the current color and the target color. The type of composition used in manufacturing cosmetics may vary, and only one composition may be used, or two or more compositions may be used.

According to the first embodiment, the total amount of the discharged composition may be predetermined. In this case, the control unit 110 may calculate the amount of the composition to be discharged according to the component ratio based on the preset total amount. For example, when the total amount of cosmetics is set to 100 g, and the cosmetic manufacturing method of mixing the first composition and the second composition in a ratio of 4:6 is calculated, the control unit 110 may control to discharge 40 g of the first composition and 60 g of the second composition.

According to the second embodiment, the total amount of the discharged composition may vary according to a length of the user's hair. In this case, the control unit 110 may calculate the total amount of the composition to be discharged based on the length of the user's hair, and calculate the amount of each composition to be discharged according to the mixing ratio of the composition based on the calculated total amount. For example, it is assumed that the cosmetic manufacturing method of mixing the first composition and the second composition in a ratio of 1:4 is calculated, and when the user's hair is a short length, the control unit 110 may calculate the total amount of the composition as 50 g, and may control to discharge 10 g of the first composition and 40 g of the second composition, and when the length of the user's hair is shoulder length, the control unit 110 may calculate the total amount of the composition as 100 g, and may control to discharge 20 g of the first composition and 80 g of the second composition.

The length of the user's hair may be input through the input unit. The input unit may receive an input of the length of the user's hair as a numerical value. For example, the input unit may receive the length of the user's hair as a numerical value such as 5 cm, 10 cm, or the like. Alternatively, the input unit may receive an input of the length of the user's hair as a position where the tip of the hair goes down, such as below the ears, shoulders, chest, and waist.

In addition, the dispenser 1 may further include a camera module (not shown). The camera module may take a picture of the user and output it to the display unit 6.

According to an embodiment, the camera module may be a microscope camera. A microscope camera can take pictures at about 20 to 500 times magnification. In this case, it is possible to provide the user with an image of a clearer skin condition, scalp condition, and hair condition.

The camera module may include a Bayer filter. The Bayer filter may divide each signal received through the image sensor into R, G, and B channels, and may generate a color image by synthesizing the three channels in an additive mixing method. In this case, it is possible to more clearly provide the user with a color change according to the use of cosmetics.

The camera module may be integrally formed with the dispenser 1. Alternatively, the camera module 1 may be provided separately from the dispenser 1, and the camera module 1 may be connected to the dispenser 1 by wire or wirelessly.

Figure 19:
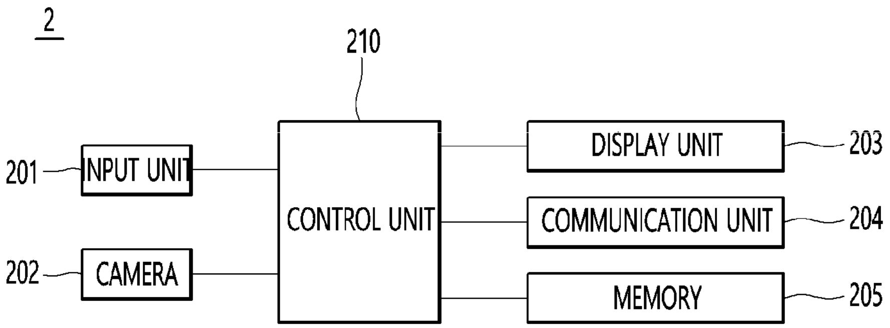
FIG. 19 is a control block diagram of a terminal according to an embodiment of the present disclosure.

FIG. 19 is a control block diagram of a terminal according to an embodiment of the present disclosure.

The terminal 2 may include at least some or all of an input unit 201, a camera 202, a display unit 203, a communication unit 204, a memory 205, and a control unit 210.

The terminal 2 may be a smart phone, but this is merely illustrative, and may include a wearable device such as a smart watch, a tablet PC, a laptop, a desktop, and the like.

The input unit 201 may receive an input command from the user. The input command may include at least one piece of information. For example, the input unit 201 may receive an input command for selecting a target color. Alternatively, the input unit 201 may receive a command for selecting a hair length. However, this is merely illustrative, and the input unit 201 may receive an input command including various information such as a recent dyeing time of the user, a current state of the hair, and the like.

The input unit 201 may be formed of a touch screen or the like, or may include a physical key button.

The camera 202 may capture the user. The camera 202 may capture a facial image of the user so that the user's skin or hair is included.

The facial image captured by the camera 202 may be used for simulation.

In addition, the facial image captured by the camera 202 may be used to determine the current color of the user's skin or hair. For example, the accuracy of the measurement may be calculated by comparing the current color of the skin or hair measured by the sensor 3.

The display unit 203 may display various information related to the manufacture of cosmetics.

For example, the display unit 203 may display at least one sample color to select the target color, a recommended color, ingredient information of the cosmetics to be manufactured, price information of the cosmetics to be manufactured, a simulation image, and the like.

The communication unit 204 may transmit/receive a signal of at least one of the sensor 3 and the dispenser 1.

In addition, when there is a separate server storing a database related to the cosmetics, the communication unit 204 may transmit/receive a signal to/from the server.

The communication unit 204 may transmit information acquired through the input unit 201, the camera 202, and the like, information stored in the memory 205, and the like to the outside. In addition, the communication unit 204 may receive various information from the outside. For example, the communication unit 204 may receive information related to the cosmetics to be manufactured from the dispenser 1.

The memory 205 may store various information related to users, cosmetics, and the like. For example, the memory 205 may store a cosmetic usage history of the user. Alternatively, the memory 205 may store information on ingredients of the cosmetics and the like.

Here, the cosmetic usage history may include information on ingredients of the cosmetics used (e.g., type of composition, weight of composition), skin condition information, color development accuracy, a hair color before dyeing, a target hair color, a hair color and hair condition information after dyeing, and the like at the time of dyeing by the user.

Here, the color development accuracy is an index indicating an accuracy of a developed actual color in comparison with the target color, and may indicate a degree of coincidence between the target color and the developed actual color. The hair condition information may include a degree of damage to the hair, a degree of dryness of the hair, and the like.

When storing the cosmetic usage history, the memory 205 may store the cosmetic usage history separately for each customer or designer.

The memory 205 may store the cosmetic usage history for each customer. Here, the customer may refer to a user who is a target of using the cosmetics. The memory 205 may store a cosmetic usage history for a first customer, a cosmetic usage history for a second customer, . . . , and a cosmetic usage history for an Nth customer.

The memory 205 may store the cosmetic usage history for each designer. Here, the designer may refer to a user who has performed dyeing using the hair dye. That is, the designer may refer to a user who has dyed another person's hair or the like with the hair dye. The memory 205 may store a cosmetic usage history for a first designer, a cosmetic usage history for a second designer, . . . , and the cosmetic usage history for an Nth designer.

As described above, when the cosmetic usage history is stored for each designer, there is an advantage that an amount of cosmetics used by designer may be easily calculated. For example, when several designers use the dispenser 1 together, an amount of cosmetics used by each designer, a price of cosmetics, and the like may be calculated based on the cosmetic usage history stored for each designer. During the same period, when an amount of cosmetics used by the first designer is 1 kg and an amount of cosmetics used by the second designer is 2 kg, the first designer and the second designer may share the cost of cosmetics in a ratio of 1:2.

The cosmetic usage history may be stored in at least one of the terminal 2 and the dispenser 1.

The controller 210 may control the overall operation of the terminal 2. The controller 210 may control at least one of the input unit 201, the camera 202, the display unit 203, the communication unit 204, and the memory 205.

Figure 20:
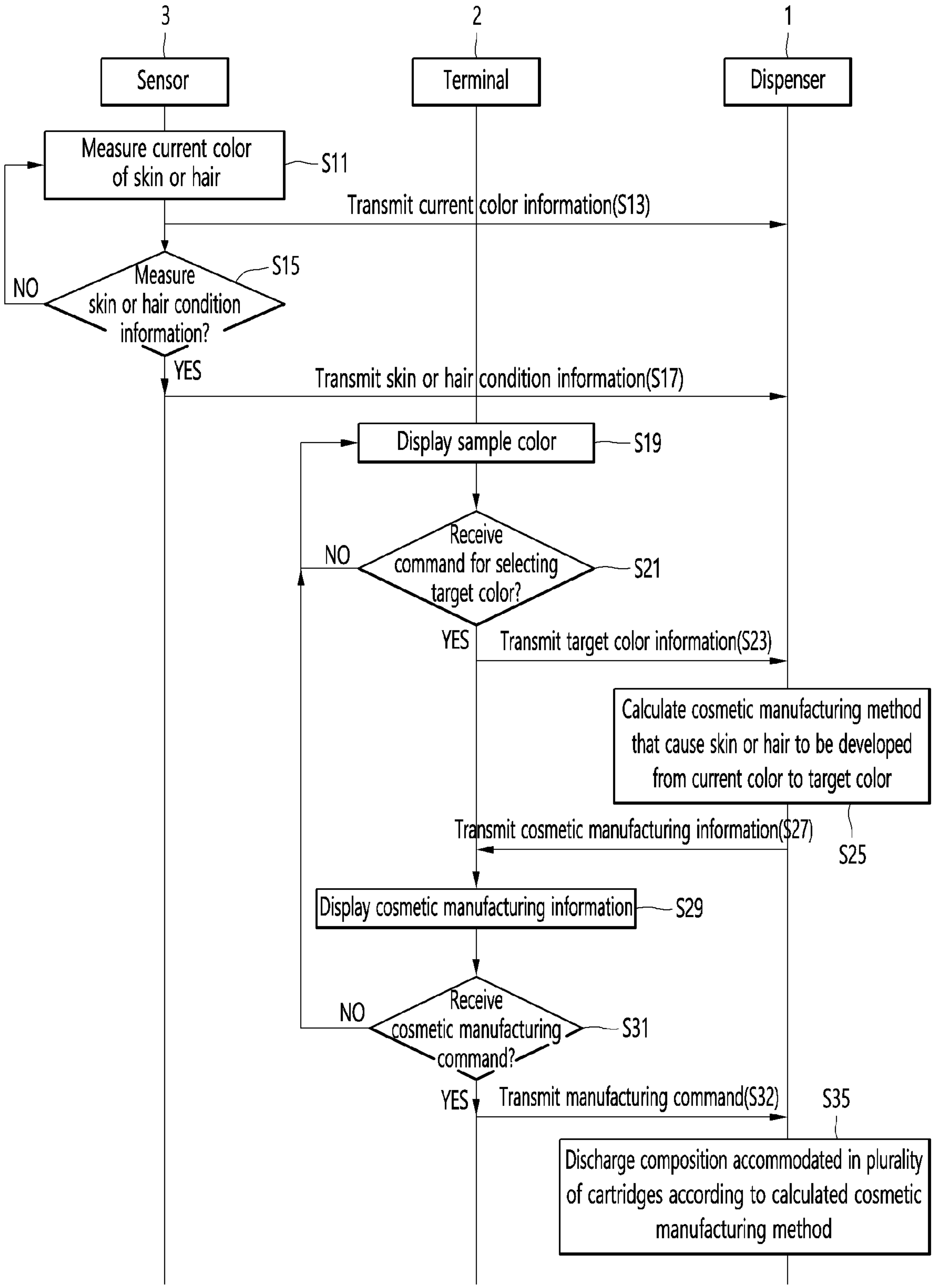
FIG. 20 is a flowchart illustrating a method of operating a cosmetic manufacturing system according to an embodiment of the present disclosure.

FIG. 20 is a flowchart illustrating a method of operating a cosmetic manufacturing system according to an embodiment of the present disclosure.

The sensor 3 may measure the current color of the skin or hair in step S11, and may transmit the current color information to the dispenser 1 in step S13.

The current color information may include at least one of a color name, a color code, and a color image.

The sensor 3 may transmit the current color information of the skin or hair to a device that calculates the cosmetic manufacturing method. That is, in FIG. 11, when the dispenser 10 calculates the cosmetic manufacturing method, the sensor 3 transmits the current color information to the dispenser 1. If, unlike that shown in FIG. 11, when the terminal 2 calculates the cosmetic manufacturing method, the sensor 3 may transmit the current color information to the terminal 2.

According to an embodiment, a step of measuring the current color of the skin or hair may be omitted, and in this case, the cosmetic manufacturing method may be calculated based on only the target color. When cosmetics manufactured by reflecting the current color of the skin or hair are used, there is an advantage that a color is developed closer to the target color than when cosmetics manufactured without reflecting the current color are used. This is because the skin or hair color of each user is slightly different, so that even though the target color is the same, a result of using the cosmetics may be different for each user. As in an embodiment of the present invention, when reflecting the current color of the skin or hair, there is an advantage that the cosmetics that are developed close to the target color are manufactured.

In addition, the sensor 3 may determine whether the skin or hair condition information has been measured in step S15.

Here, the skin or hair condition information may be information on variables that may affect the cosmetics usage result. For example, the skin or hair condition information may include skin moisture, skin blemishes, hair thickness, hair dryness, hair damage, or the like.

When the sensor 3 measures the skin or hair condition information, the sensor 3 may transmit the measured skin or hair condition information to the dispenser 1 in step S17.

As described above, when the terminal 2 calculates the cosmetic manufacturing method, the sensor 3 may transmit the skin or hair condition information to the terminal 2.

The terminal 2 may display a sample color in step S19.

The sample color is a color of skin or hair expected to be developed, and may be a preview color. The terminal 2 may display a plurality of sample colors.

The terminal 2 may determine whether a command for selecting the target color has been received in step S21, and when the target color is selected, the terminal 2 may transmit the target color information to the dispenser 1 in step S23.

When the terminal 2 receives a command for selecting any one of the sample colors, the terminal 2 may recognize that the command for selecting the target color has received. The target color may be a color selected from among the sample colors.

When the terminal 2 does not receive the command for selecting the target color, the terminal 2 may continuously display the sample color. According to the embodiment, when the target color is not selected for more than a preset time, the terminal 2 may change the displayed sample color. That is, after displaying first to sixth sample colors, when the target color is not selected for the preset time or more, the terminal 2 may display seventh to twelfth sample colors instead of the first to sixth sample colors.

Meanwhile, the terminal 2 is not limited to displaying the plurality of sample colors, the display unit 6 of the dispenser 1 may display the plurality of sample colors, and the input unit 101 of the dispenser 1 may receive the command for selecting the target color that selects one of the plurality of sample colors.

When the dispenser 1 receives the target color information from the terminal 2, the dispenser 1 may calculate the cosmetic manufacturing method that causes the skin or hair to be developed from the current color to the target color in step S25.

According to the first embodiment, the control unit 110 may calculate the cosmetic manufacturing method based on the cosmetic manufacturing database. That is, in order to manufacture the cosmetics that causes the skin or hair to be developed from the current color to the target color, the control unit 110 may calculate the cosmetic manufacturing method including at least one cartridge 5 accommodating the composition to be discharged and the weight information of the composition to be discharged from each cartridge.

According to the second embodiment, the control unit 110 may calculate the cosmetic manufacturing method that causes the skin or hair to be developed from the current color to the target color based on the skin or hair condition information.

When the hair dye is described as an example, the sensor 3 may measure the current color of the hair and also measure the hair condition information, such as the degree of damage to the hair and the degree of dryness of the hair. For example, when the degree of hair damage is greater than or equal to a preset reference value, the control unit 110 may calculate a cosmetic manufacturing method in which a specific composition is included less than a preset reference value. Here, the specific composition is a composition preset to a high degree of hair damage, and may be, for example, an oxidizing agent. For another example, when the dryness of the hair is less than a preset reference value, the control unit 110 may calculate a cosmetic manufacturing method in which a specific composition is included a preset reference value or more. Here, the specific composition may be a composition such as a nutrient that supplies moisture and shine to the hair. As described above, when the cosmetic manufacturing method is calculated in consideration of the hair condition of the user, there is an advantage that it is possible to manufacture cosmetics suitable for the hair of the user, such as protecting the hair of the user.

According to a third embodiment, after acquiring the cosmetic manufacturing method based on the cosmetic manufacturing database, the control unit 110 may calculate the cosmetic manufacturing method by correcting the acquired cosmetic manufacturing method based on the cosmetic usage history.

Specifically, the control unit 110 may first acquire the cosmetic manufacturing method that causes the skin or hair to be developed from the current color to the target color based on the cosmetic manufacturing database. After acquiring the cosmetic manufacturing method, the control unit 110 may confirm whether the cosmetic usage history is stored. That is, after acquiring the cosmetic manufacturing method, the control unit 110 may determine whether there is a cosmetic usage history already stored for a user who has requested the manufacture of cosmetics. The control unit 110 may control to manufacture cosmetics according to the acquired cosmetics manufacturing method when there is no the already stored cosmetic usage history. Alternatively, when there is the already stored cosmetic usage history, the control unit 110 may correct the acquired cosmetics manufacturing method.

A correction method may be as follows. For example, the control unit 110 may acquire the current color and the target color of the skin or hair requested for the manufacture of cosmetics, and may detect a past history consisting of a color closest to the current color and the target color acquired from the cosmetic usage history. When the accuracy of color development included in the past history is greater than or equal to the preset reference value, the control unit 110 may compare cosmetic ingredients according to the past history with cosmetic ingredients acquired according to the manufacturing request. The control unit 110 may correct the cosmetic manufacturing method so that the cosmetic ingredients acquired according to the manufacturing request are similar to the cosmetic ingredients according to the past history. Alternatively, when the accuracy of color development included in the past history is less than the preset reference value, the controller 1110 may compare the cosmetic ingredients according to the past history with the cosmetic ingredients acquired according to the manufacturing request. The control unit 110 may correct the cosmetic manufacturing method so that the cosmetic ingredients acquired according to the manufacturing request are different from the cosmetic ingredients according to the past history.

The control unit 110 may change the ingredients of the composition or adjust the discharging amount of the composition to correct the cosmetic manufacturing method. Accordingly, there is an advantage that the cosmetics may be manufactured according to skin or hair characteristics of each user.

The above-described embodiments may be implemented individually, or may be implemented by combining two or more embodiments.

The communication unit 103 of the dispenser 1 may transmit cosmetic manufacturing information to the terminal 2 in step S27, and the terminal 1 may display the cosmetic manufacturing information in step S29.

The cosmetic manufacturing information may be cosmetic information according to the cosmetic manufacturing method calculated in step S25. After calculating the cosmetic manufacturing method, the dispenser 1 may transmit the cosmetic manufacturing method to the terminal 2 to guide the cosmetic information to the user before manufacturing the cosmetics.

According to the embodiment, steps S27 and S29 and steps S31 and S32 to be described later may be omitted. That is, the dispenser 1 may manufacture the cosmetics by discharging the composition accommodated in the plurality of cartridges 5 according to the calculated manufacturing method immediately after calculating the cosmetic manufacturing method.

The control unit 210 of the terminal 2 may determine whether a cosmetic manufacturing command is received in step S31. When receiving the cosmetic manufacturing command, the control unit 210 of the terminal 2 transmits the manufacturing command to the dispenser 1 in step S32, and when receiving a cosmetic manufacturing cancellation command, the control unit 210 may return to step S19 to display the sample color again.

The dispenser 1 may receive the cosmetic manufacturing command from the terminal 2. When the dispenser 1 receives the cosmetics manufacturing command from the terminal 2, the dispenser 1 may manufacture cosmetics by discharging the composition accommodated in the plurality of cartridges 5 according to the cosmetic manufacturing method calculated in step S25.

The product manufactured by the dispenser 1 is not limited to cosmetics, and it is reasonable that the present disclosure is not limited to a type of product.

The above description is merely illustrative of the technical spirit of the present invention, and various modifications and variations will be possible without departing from the essential characteristics of the present invention by those skilled in the art to which the present invention pertains.

Therefore, the embodiments disclosed in the present invention are not intended to limit the technical spirit of the present invention, but to explain, and the scope of the technical spirit of the present invention is not limited by these embodiments.

The protection scope of the present invention should be construed by the following claims, and all technical ideas within the equivalent range should be construed as being included in the scope of the present invention.

The invention claimed is:

1. A dispenser comprising:
- a housing;
- a plurality of cartridges having an actuator and disposed inside the housing;
- a mounting body to which the plurality of cartridges are mounted so as to be replaceable;
- a main motor that rotates the mounting body;
- an elevating body that moves up and down so that a composition is discharged from any one of the plurality of cartridges; and
- a controller configured to control movement of the elevating body,
- wherein the elevating body is disposed so as to be deviated from a rotation path on which the plurality of cartridges rotate,
- wherein the actuator includes a discharging body having an outlet for discharging the composition, an operation body for opening the outlet by the pressure in contact with the elevating body, and a step portion defined by the discharging body and the operation body,
- wherein the elevating body and the discharging body are disposed under the operation body and overlapped with the operation body,
- wherein the discharging body is disposed on the rotation path,
- wherein a side surface of the elevating body is spaced apart from the discharging body, and an upper surface of the elevating body contacts the operation body while moving in a vertical direction from the rotation path,
- wherein the controller is further configured to control contact time of the elevating body and the operation body based on weigh information included in a cosmetic manufacturing method, and
- wherein the elevating body moves up and down above the outlet through which the composition is discharged, and the outlet is opened by the pressure being applied to the operation body as the elevating body moves up and is in contact with the step portion of the actuator.

2. The dispenser of claim 1, wherein a container in which the composition is accommodated and the actuator for discharging the composition accommodated in the container are formed in each of the plurality of cartridges.

3. The dispenser of claim 2, further comprising an elevating motor installed on a main body supporting the mounting body,
- wherein the elevating body is connected to a side surface of the elevating motor.

4. The dispenser of claim 2, wherein the elevating body is disposed closer to a front surface of the housing than the mounting body.

5. The dispenser of claim 1, wherein a plurality of mounting holes in which lower portions of each of the plurality of cartridges are accommodated are formed in the mounting body.

6. The dispenser of claim 5, wherein a rubber ring is disposed in each of the plurality of mounting holes.

7. The dispenser of claim 1, wherein a plurality of fixing members for fixing each of the plurality of cartridges are formed on the mounting body, and
- an upper portion of each of the plurality of cartridges is fixed by the plurality of fixing members.

8. The dispenser of claim 1, further comprising an accommodating body in which a basket in which the composition discharged from the plurality of cartridges is accommodated,
- wherein the accommodating body is detachable from the housing.

9. The dispenser of claim 8, wherein a plate on which the basket is seated is formed on the accommodating body, and
- a connection member that is in contact with a weight sensor when the accommodating body is disposed in the housing is formed on the plate.

10. The dispenser of claim 8, wherein a connection hole through which the connection member passes is formed in a base of the accommodating body.

11. The dispenser of claim 10, wherein a protrusion protruding upward from the base is formed around the connection hole.

12. The dispenser of claim 1, further comprising a plurality of pedestals receiving the composition discharged from the cartridges under the plurality of cartridges.

13. The dispenser of claim 12, wherein a cutter protruding upward is formed on at least one of the plurality of pedestals.

14. The dispenser of claim 13, wherein an upper end of the cutter is formed at the same height or lower than an outlet of the cartridge.

15. The dispenser of claim 13, wherein the cutter is in plural, and the plurality of cutters have different heights.

16. The dispenser of claim 13, wherein the cutter is inclined toward a direction of rotation of the cartridge or a direction opposite to the direction of rotation of the cartridge.

17. The dispenser of claim 16, wherein when there are a plurality of the cutters, an angle at which each of the plurality of cutters is inclined is the same or different.

18. The dispenser of claim 1, wherein the operation body moves toward the discharging body to open the outlet.

19. The dispenser of claim 1, wherein the actuator is directly under the cartridge.

20. The dispenser of claim 1, wherein the mounting body comprises an upper mounting body having a plurality of fixing members and a lower mounting body having a plurality of mounting holes.

* * * * *